July 16, 1929. H. D. GEYER 1,720,953
TRANSFORMABLE TYPE AUTOMOBILE BODY
Filed May 2, 1924 7 Sheets-Sheet 1

Inventor.
Harvey D. Geyer
By Spencer Sewall & Hardman
his Attorneys

July 16, 1929.  H. D. GEYER  1,720,953
TRANSFORMABLE TYPE AUTOMOBILE BODY
Filed May 2, 1924  7 Sheets-Sheet 7

Inventor.
Harvey D. Geyer
By Spencer Sewall & Hardman
his Attorneys

Patented July 16, 1929.

1,720,953

UNITED STATES PATENT OFFICE.

HARVEY D. GEYER, OF DAYTON, OHIO, ASSIGNOR TO GENERAL MOTORS CORPORATION, OF DETROIT, MICHIGAN, A CORPORATION OF DELAWARE.

TRANSFORMABLE-TYPE AUTOMOBILE BODY.

Application filed May 2, 1924. Serial No. 710,646.

This invention relates to vehicle bodies, especially to passenger automobile bodies, wherein the upper enclosure panels of the body may be quickly and easily transformed so as to change the body from a closed to open type, or vice versa.

Among the objects of this invention is to provide a transformable vehicle body which may be easily transformed from open to closed type, or vice versa, without the person or persons making the change having to get outside the body.

Another object is to provide a transverse well immediately back of the front seat (in a two seated body) for the reception of the removable panels when the body is open, whereby the lines of the body sides do not have to be specially designed to permit of such wells in the sides of the body itself. When the wells for the removable panels are in the sides of the body, these sides ordinarily have to be substantially plain in order to accommodate the straight plane removable panels. However, with this invention the body sides may be curved inwardly toward the bottom thereof as in a great many open type body designs, or shaped and curved in most any manner desired by the body designer without giving primary consideration to the well for the removable panels.

Another object is to provide a rigid stationary frame for said well which rigid frame also constitutes a transverse bulkhead across the car body thus increasing the rigidity of the entire body and preventing vibration and consequent rattling of the removable panels when in raised position as well as when in lowered or concealed position.

Another object is to provide a transformable enclosure whose panels may be fastened in a number of various positions giving various useful arrangements thereof as hereinafter described.

Another object is to provide removable panels above the body side doors, said panels being swingable with the doors about axes in substantial alignment with the axes of the door hinges whereby relative movement between the panel and door upon the opening of the door is substantially eliminated.

Another object is to provide a vertically reciprocable hinge post at each side of the car body upon which the removable panels are hingedly mounted and adapted to be raised or lowered therewith as a unit.

Other objects relate to the carrying out of the above mentioned objects in a simple and efficient form as will appear hereinafter.

Other objects and advantages of the present invention will be apparent from the following description, reference being had to the accompanying drawings, wherein a preferred form of embodiment of the present invention is clearly shown.

In the drawings.

In the drawings like or similar reference characters refer to like or similar parts throughout the several views.

Figure 7:
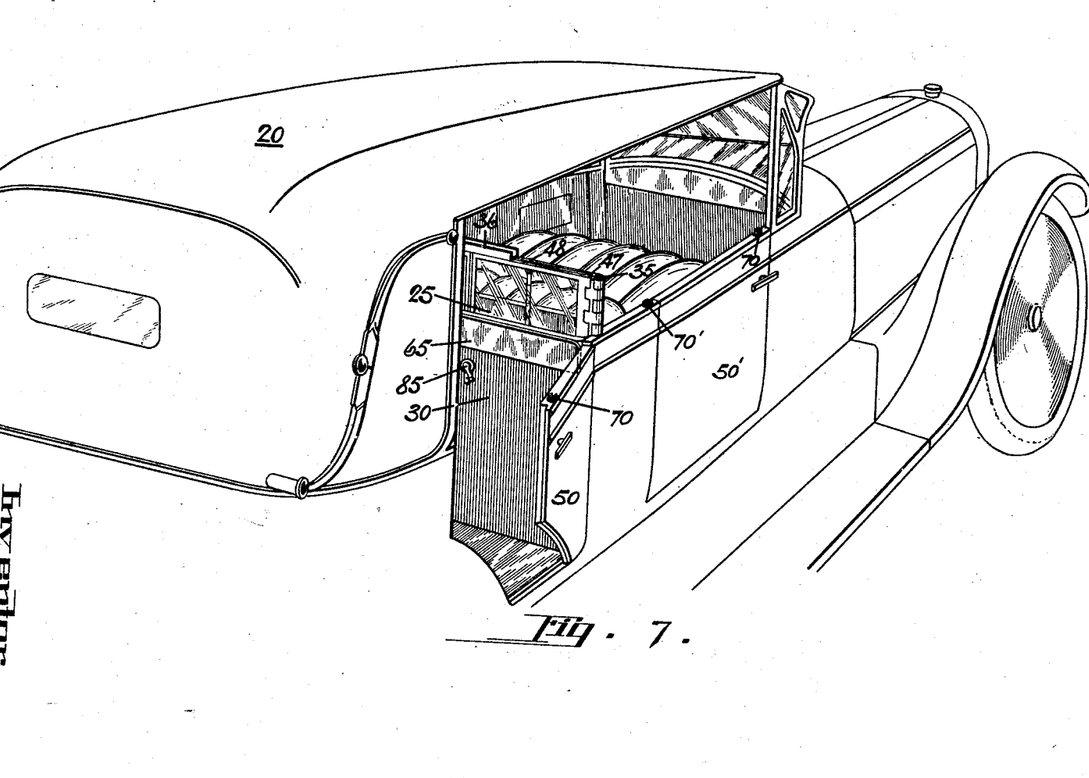
Fig. 7 is a perspective view showing the removable panels in partly raised position in the carrying well, and also showing the relative positions of the vertically reciprocable hinge posts and the body door hinges.

The embodiment of the invention chosen for detailed illustration and description comprises a two-seated passenger automobile body having a collapsible top 20 which collapses in a manner well known in the art. The automobile body may be of substantially conventional design so far as the general body lines are concerned, such as illustrated in Fig. 7. Immediately behind the front seat a substantially vertical well 25 is built into the body for carrying the removable panels when they are not in use for enclosure purposes. These removable panels are carried by a movable frame, designated as a whole by numeral 26, which may be raised or lowered out of or into the well 25, being guided in this raising or lowering movement by the stationary guide posts 27. These guide posts 27 are preferably metal castings and are very rigidly fastened by suitable means such as large wood screws to the vertical frame members 28 of the body sides (see Fig. 9). In addition to being fastened rigidly to the body sides the guide posts 27 are also rigidly braced apart by the substantial transverse wall 30 which is secured to the flanges 29 of the guide posts 27 by the bolts or screws 31. This wall 30 is preferably of wood construction with stiff angle or channel members at the top and bottom thereof rigidly secured to the guide posts 27 to form a rigid frame. The guide posts 27 are preferably also braced by the wood partition wall 32 which is rigidly tied to the frame members 28 by suitable means. This partition wall 32 separates the carrying well 25 and the back cushion of the front seat. The wall 32 may be utilized to support the springs of the back cushion itself, thereby becoming a part of the back cushion construction. The bottom ends of the posts 27 are suitably anchored to the body sills 33.

It will now be obvious that the two guide posts 27 together with the transverse walls 30 and 32 form in effect a rigid transverse bulkhead which will support and strengthen the sides of the car body and prevent undue twisting, warping, or deflection of the body. Such twisting or deflection of the body, if permitted, would sooner or later cause the removable panels to fit poorly when in raised position, or even to break the glass of which the panels may be made. Also since the movable frame 26 has a sliding fit between the two guide posts 27 it is necessary that these guide posts be held quite rigidly fixed relative to each other in order to give easy movement of the movable frame 26 and at the same time not have excessive clearance such as would permit the parts to rattle.

Figures 8, 9:
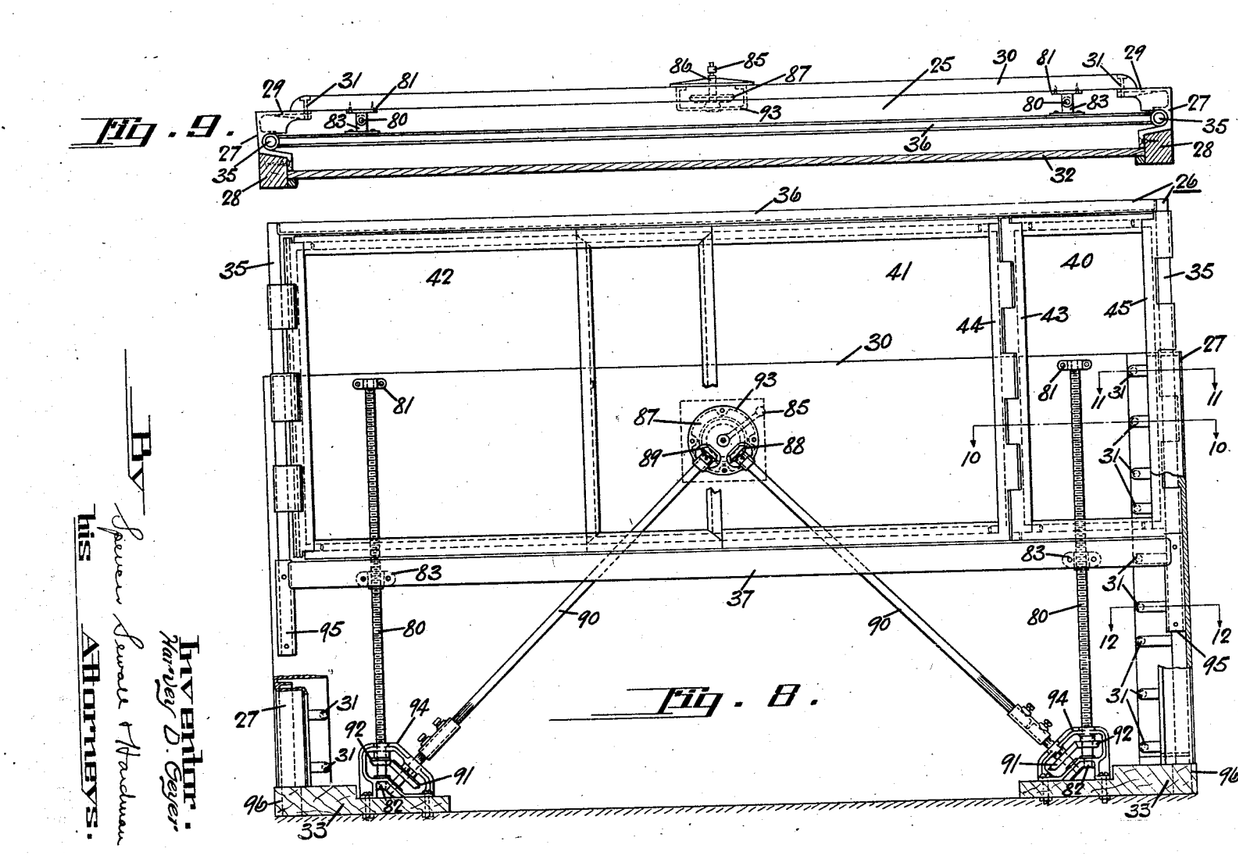
Fig. 8 is a view showing the assembly of the removable panels hinged to the vertically reciprocable hinge posts, the stationary guide posts for the hinge posts, and the operating mechanism for raising or lowering the panels out of or into the carrying well.
Fig. 9 is a top view of Fig. 8 showing in addition thereto the stationary transverse bulkhead to which the guide posts are rigidly secured.
Figures 10, 11, 12, 13:
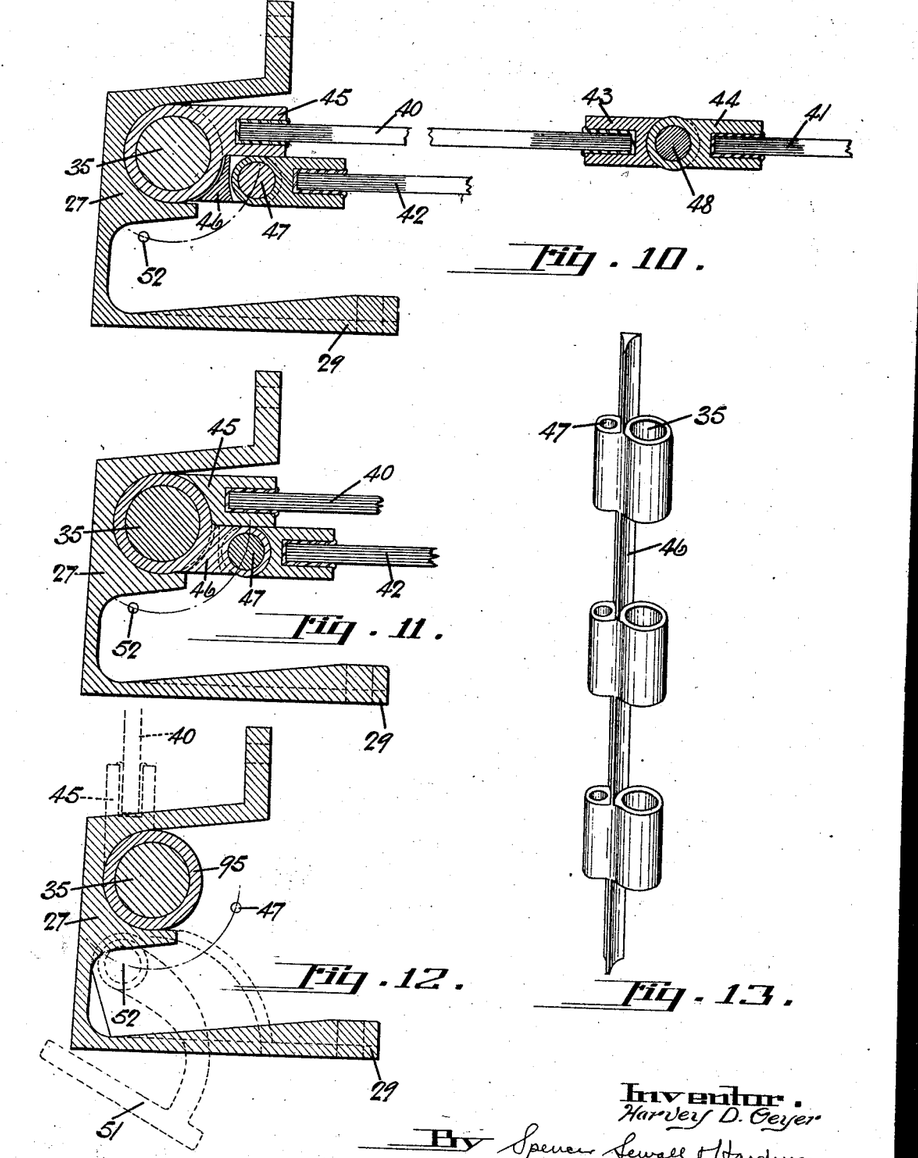
Fig. 10 is a section on an enlarged scale on line 10—10 of Fig. 8.
Fig. 11 is a view similar to Fig. 10 but taken on line 11—11 of Fig. 8.
Fig. 12 is a section on line 12—12 of Fig. 8 through the stationary guide post and the lower end of the reciprocable hinge post and shows the alignment of the panel hinge when the panel is in extended position with the door hinge (shown in dotted lines).
Fig. 13 is a perspective view of the part shown in Figs. 10 and 11 which enables the panel hinge to be swung into alignment with the door hinge.

A detailed description of the panel-carrying movable frame 26 and associated mechanism will now be given. The frame 26 comprises two hinge posts 35 which are bridged together at the top by the cross channel 36 and at the bottom by the cross channel 37, these four parts being connected to form a rigid frame (see Fig. 8). Hingedly mounted upon each post 35 are two enclosure panels 40 and 41 which swing forwardly, and one enclosure panel 42 which swings rearwardly about post 35 as a pivot (see Figs. 8, 10 and 11). In Fig. 8, the two forwardly swinging panels 40 and 41 are shown on the right side of the figure with the rearwardly swinging panel 42 removed, while on the left side of the figure the panel 42 is shown with panels 40 and 41 removed. In the sectional Figures 10 and 11, however, both forwardly and rearwardly swinging panels are shown. Each of the panels is preferably made of glass set within a metallic frame, certain sides of which frame also constituting the hinge members as clearly shown in the drawings. The panels 40 and 41 are hinged together by the two hinge members 43 and 44 (see Fig. 10) and both panels are hingedly supported upon post 35 by means of the hinge member 45. The rear panel 42 is hinged about the pivot pin 47 directly upon the swinging hinge member 46 which in turn is hinged upon post 35 (see Figs. 10 and 11). The door 50 for entering the rear compartment of the body is hung upon the stationary guide post 27 by means of two or more hinges 51 which are set within suitable recesses in the sides of flange 29 of post 27 in order to locate the hinge axis 52 of the hinges 51 as close as possible to the hinge post 35 (see Fig. 12). Now the swinging hinge member 46 is so designed that when the panel 42 is swung rearwardly the pivot pin 47 falls directly in alignment with the hinge axis 52 about which the door 50 pivots. It will be clear then that if the pivot pin 47 is held in alignment with the door hinge axis 52 the panel 42 may be attached to the door 50 and be opened or closed therewith without relative movement between the panel and door.

Figure 14:
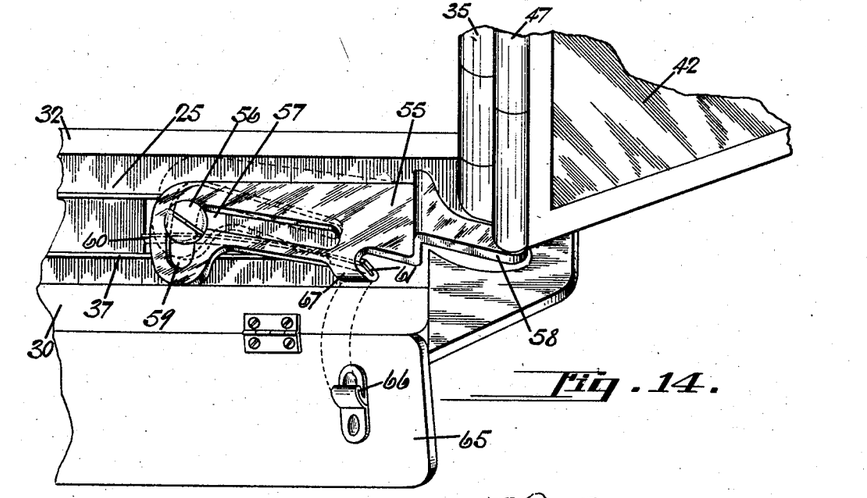
Fig. 14 is a perspective view showing the hinged cover for the carrying well and the retaining latch operated thereby for holding the panel hinge positively in place in alignment with the door hinge.

In Fig. 14 there is clearly illustrated such a retaining means. The lower cross channel 37 of the movable frame 26 has the retaining latch 55 slidably mounted thereupon by means of the pin 56 which extends through the longitudinal slot 57 in the latch 55. The outer end 58 of latch 55 is pivoted to the lower end of the pivot pin 47 which projects slightly below the panel 42. It will be clear that when hinge member 46 is swung about post 35 as a pivot the outer end 58 of latch 55 has a rotating motion while the opposite end of latch 55 has a reciprocating motion, being guided by the pin 56 riding in slot 57. When the pivot pin 47 is in alignment with the door hinge axis 52 the pin 56 lies opposite an offset notch 59 in the slot 57 but is yieldably held from entering notch 59 by the small leaf spring 60 rigidly attached at 61 to the latch 55. If the hinged cover 65 for the well 25 be now thrown into position to cover the open top of well 25 the projecting lug 66 attached to cover 65 will engage the cam surface 67 on latch 55 and thus move latch 55 laterally to cause pin 56 to enter notch 59 against the resistance of spring 60, as shown in dotted lines in Fig. 14. It is obvious that latch 55 will then be held against reciprocatory motion and hence the pivot pin 47 will be retained in its position in alignment with the door hinge axis 52 as long as the cover 65 is in the position covering the well 25. When however cover 65 is thrown back to the position shown in Fig. 14, the spring 60 bearing upon the pin 56 will automatically move latch 55 to cause the pin 56 to again lie in longitudinal slot 57. Of course the pivot pin 47 may then be rotated about the post 35.

Figures 15, 16, 17:
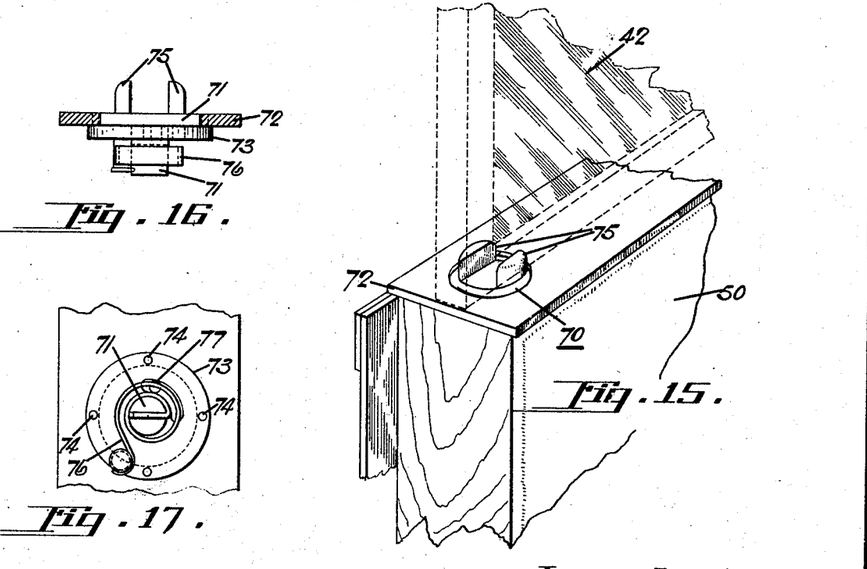
Fig. 15 is a perspective view showing the spring pressed clamp on the outer end of the top edge of the door for holding the removable panel in engagement with the door.
Fig. 16 is a side elevation of this spring-pressed clamp in position on the top moulding strip of the door.
Fig. 17 is a bottom view of the clamp shown in Fig. 16.

The means for attaching panel 42 to the door 50 is shown in Figs. 15, 16 and 17. Near the outermost end of the top edge of the door 50 is mounted the spring-pressed clamp 70 which engages the metal frame of the panel 42 and thus attaches panel 42 to the door 50 so that the two may be swung open and shut together since they are pivoted about the same axis, as described hereinabove. The clamp 70 comprises a forked member 71 rotatably mounted within a hole extending through the metallic top molding strip 72 of door 50 by means of the annular plate 73 which is suitably secured to the molding strip 72 by the pins 74. The top surface of member 71 lies flush with the top surface of the molding strip 72 with the exception of the two prongs 75 which are spaced sufficiently far apart to permit the end of the lower edge of panel 42 to be easily inserted between the prongs 75 (see Fig. 15). The forked member 71 is constrained by a coil spring 76 to rotate about its vertical axis until the prongs 75 take a slightly angular position relative to the door 50 at which point a stop lug 77 prevents further rotation of the forked member 71. Now in order to insert the panel 42 in the slot between the prongs 75 the edge of panel 42 must first be placed in position to enter said slot before the pivot pin 47 is swung outwardly. Then when the pivot pin 47 is swung to align with the door hinge axis 52 the panel 42 moves rearwardly into the slot between prongs 75 thereby rotating the forked member 71 against the resistance of coil spring 76 to cause the slot between prongs 75 to align with the plane of the door 50. The diagonally opposite vertical edges of the prongs 75 will therefore bite against the metal frame of panel 42 and thus hold the panel tightly clamped against any lateral movement relative to the door and yet yields to relative longitudinal movement therebetween in case the pivot axes of the two should not always be in exact alignment. This form of clamp is unobtrusive in appearance, and presents a minimum obstruction when the the panels are not in raised position and also prevents any rattling of the glass panels when in raised position. Clamps 70 are also provided on the front doors 50' for holding the panels 41 in place and causing them to open and shut with the doors. The tip end of panel 41 is inserted in the slot in clamp 70 in a manner similar to that above described for the panel 42 and the rear door 50. If desired, a clamp 70' may be provided in the position substantially as shown in Fig. 7 to positively retain the panel 40 in its proper position and hold the pivot pin 48 substantially in alignment with the hinge axis of door 50'. This clamp 70' however must be so designed that the panel 40 may be laterally moved into engagement therewith. Preferably clamp 70' is designed with means whereby it may be depressed substantially flush with the top molding strip 72 to permit panel 40 to swing to a position directly above it, after which the clamp 70' is raised to engage and clamp the lower edge of panel 40. It is not thought necessary to illustrate and describe in more detail such a clamping means, as those skilled in the art can easily design a clamp to accomplish the functions above described. It has been found that the retaining latch 55 and the retaining clamp 70' may be dispensed with when the panels 42 and 41 are held to the doors 50 and 50' by clamps (such as 70) which permit sliding of the panels relative to the doors. In such a case the various hinges of the panels are preferably made to work with a considerable amount of friction so that the panels will naturally remain in their proper positions even though the pivot pins 47 and 48 are not positively held in alignment with the door hinges.

Figure 1:
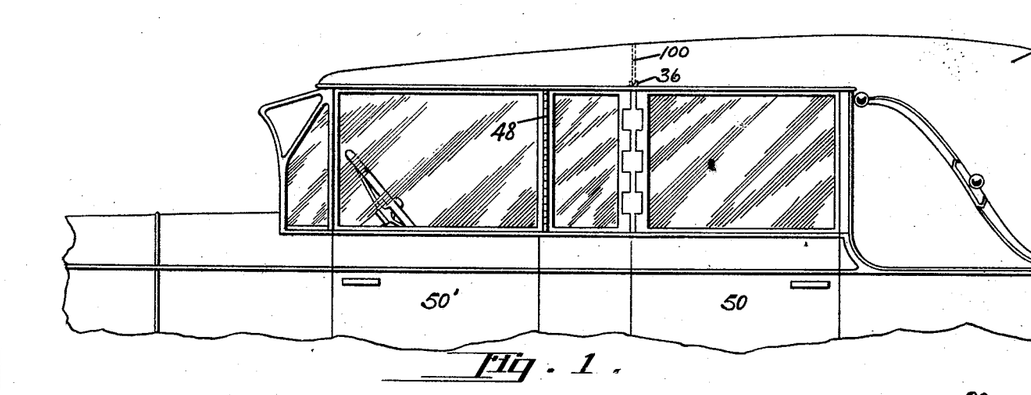
Fig. 1 is a side elevation of an automobile two seat body embodying the transformable enclosure of this invention, the removable panels being in completely closed position.
Figure 2:
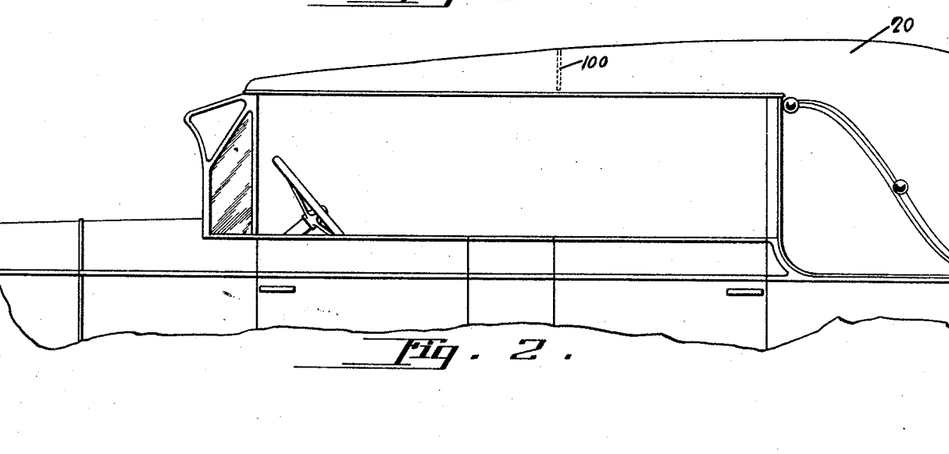
Fig. 2 is a similar view with the removable panels completely retracted into the carrying well behind the front seat, giving the effect of an open type body.
Figure 3:
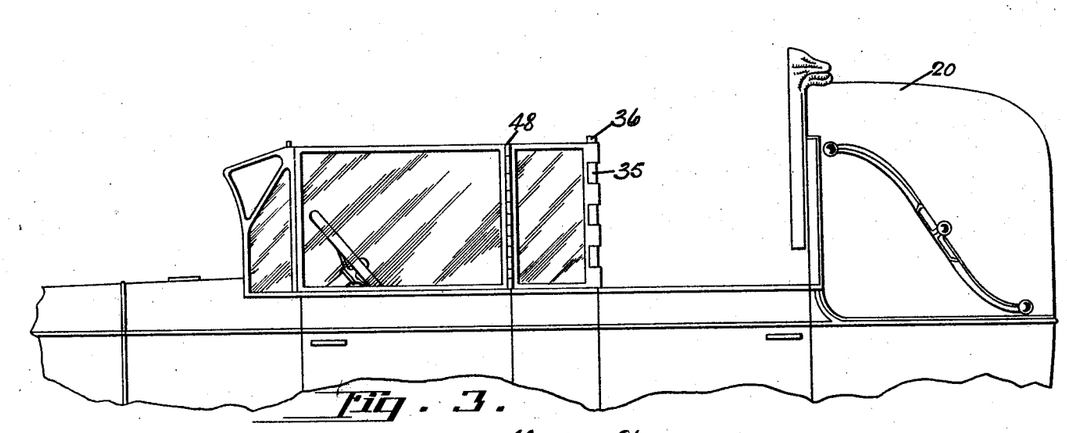
Fig. 3 shows the top partly collapsed and the removable panels arranged to close the sides and rear of the front seat compartment.
Figure 4:
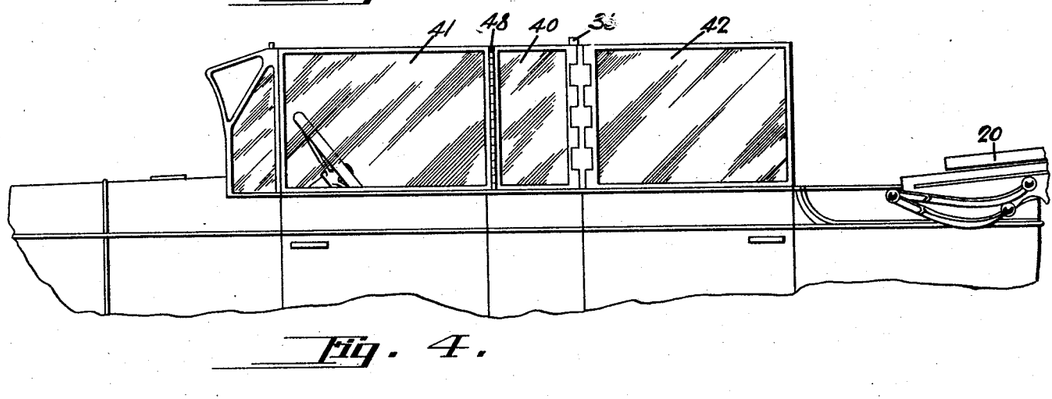
Fig. 4 shows the top completely collapsed and the removable panels arranged to close the sides of both front and rear seat compartments.
Figure 5:
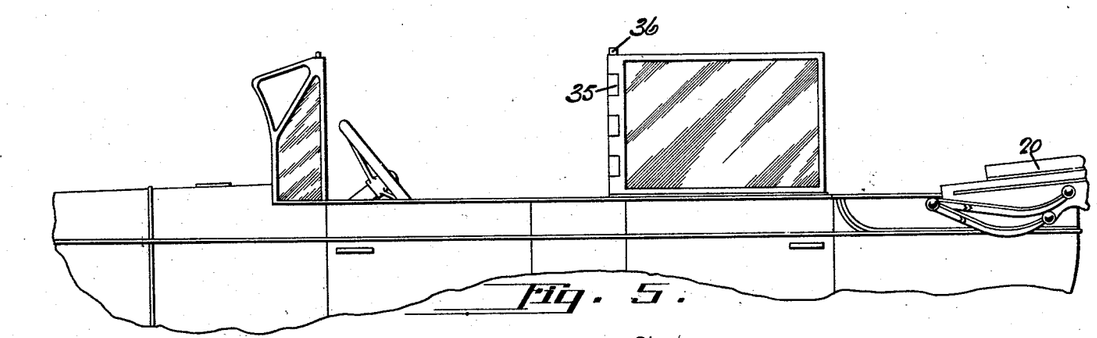
Fig. 5 shows the top completely collapsed and the panels arranged to close the front and sides of the rear seat compartment only.
Figure 6:
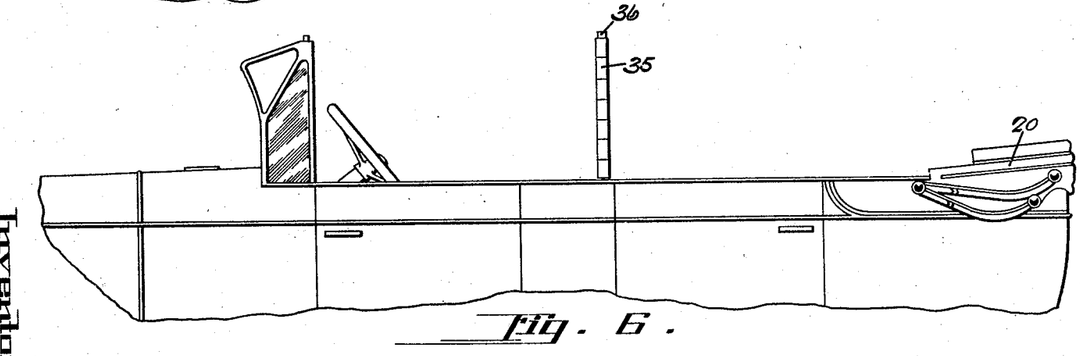
Fig. 6 shows the top completely collapsed and all the removable panels arranged transversely the car body to act as a tonneau shield.

The mechanism for raising and lowering the movable frame 26 together with all the movable panels into or out of the carrying well 25 will now be described. Two threaded shafts 80 are rotatably mounted upon bearings 81, attached to the rigid transverse wall 30, and thrust bearings 82 rigidly attached to the body sills, as shown in Fig. 8. The bottom cross channel member 37 of the frame 26 has suitably attached thereto the two travelling nuts 83 which move vertically along the shafts 80 when the same are rotated. These two shafts 80 are rotated simultaneously and at exactly the same speed by the manually operated crank handle 85, the short shaft 86, bevel pinions 87, 88 and 89, the two diagonal shafts 90, and the bevel gears 91 and 92, all as clearly shown in Fig. 8. The gears 87, 88 and 89 are preferably enclosed in a suitable gear box 93 mounted upon the transverse wall 30 (see Figs. 8 and 9). The gears 91 and 92 are preferably enclosed in a gear box 94 mounted upon the sills of the car body, which gear box is also integrally formed with the thrust bearings 82 for the threaded shafts 80. By this substantial construction the frame 26 may be smoothly and easily vertically operated between the stationary guide posts 27. The threads on the shafts 80 are preferably of such a pitch that the drive will be irreversible and hence the frame 26 may be supported in partially raised or fully raised position by the two nuts 83. However, if desired, additional suitable catches may be provided to positively hold the frame 26 in its fully raised position. The top 20 is preferably provided with a transverse partition 100 built within the top and having its lower edge adapted to fit snugly within the channel 36 when the frame 26 is raised to its topmost position (see Fig. 1). By this means the frame 26 and the top 20 mutually brace and support one another and since the hinge posts 35 are thus supported at their upper ends it will be clear that the movable panels 40, 41 and 42 will be more firmly held in their proper positions. The hinge posts 35 have an enlarged depending portion 95 below the hinge members 45 and 46, which depending portion snugly fits the guide posts 27 (see Fig. 12). When the frame 26 is in its fully raised position these depending portions 95 extend downwardly within the guide posts 27 a substantial distance and so brace and support the frame 26.

When the frame 26 is in its lowermost position in well 25, the depending portions 95 project downwardly through holes 96 provided therefor (see Fig. 8).

It will now be obvious that this invention provides a transformable body having enclosure panels which, when not in use, are carried in a concealed well in such a way that said panels will not be subjected to excessive vibration and hence can be easily prevented from rattling or shaking loose. Suitable means are provided for clamping all the panels together when the movable frame 26 is in its retracted or lowermost position to prevent vibration or rattling thereof.

Preferably the metal frames about the panels are provided with an outwardly projecting rubber flange to seal the cracks around the periphery thereof when in raised position. Such a rubber flange will of course also prevent the metal frames of the panels from rubbing directly against the top molding strips of the body sides, the windshield standard, and against the top, and thus will prevent rattling of the parts as well as any marring or defacing thereof. Suitable rubber bumpers are preferably provided in the rabbet in the windshield standard for the front swinging panels 41, and in the vertical rabbet in the top 20 and for the rear swinging panel 42.

The various positions in which the panels may be suitably fixed in position are clearly shown in the drawings in Figs. 1 to 7 inclusive.

While the form of embodiment of the present invention as herein disclosed, constitutes a preferred form, it is to be understood that other forms might be adopted, all coming within the scope of the claims which follow.

I claim:

1. In a vehicle body having a door hinged at one edge to the side of the vehicle body, in combination, removable closure means for effectively increasing the height of the door, including: a vertically reciprocable hinge post having a path of movement closely adjacent to the door hinge and substantially parallel with the axis thereof, a movable panel hinged to said hinge post and swingable about said post when in raised position to lie above said door, means for securing said panel to said door to cause said panel and door to swing together, said panel having a hinge therein which falls substantially in alignment with the door hinge when the panel is secured to the door to swing therewith, said panel being also swingable about said post to a position transverse said body, and means to lower said hinge post and panel as a unit when said panel lies in transverse position.

2. In a vehicle body having a seat back transverse the central portion thereof and having a body top spaced from the upper edges of the body sides leaving side openings both forward and rearward of said seat back, in combination, transformable closure means for closing said openings, comprising: a transverse well located adjacent said seat back and having two opposed vertical guide posts rigidly fixed therein, two vertically reciprocal hinge posts slidable within said guide posts to a point adjacent said body top, two closure panels hinged about a common hinge axis to each of said posts and lying in closely adjacent parallel relation to one another so as to occupy a minimum space when in lowered position within said well, said closure panels being swingable about said posts both forwardly and rearwardly respectively when said posts are in raised position to lie in substantial alignment with the body sides and form a closure for said side openings.

3. In a vehicle body having a seat back transverse the central portion thereof and having a body top spaced from the upper edges of the body sides leaving side openings both forward and rearward of said seat back, in combination, transformable closure means for closing said openings, comprising: a transverse well located adjacent to said seat back, and having two opposed vertical guide posts rigidly fixed therein, two vertically reciprocal hinge posts slidable within said guide posts to a point adjacent said body top, a plurality of closure panels hinged about a common hinge axis to each of said posts and swingable into a compact transverse position and substantially contacting parallel relation for lowering into said well, and swingable both forwardly and rearwardly when said posts are raised to substantially align with the body sides and form a closure for said side openings.

4. In a vehicle body having a seat back transverse the central portion thereof and having a body top spaced from the upper edges of the body sides leaving side openings both forward and rearward of said seat back, in combination, transformable closure means for closing said openings, comprising: a transverse well located adjacent said seat back, and having a vertical guide post rigidly fixed therein, a vertically reciprocable hinge post slidable within said guide post to a point adjacent the body top, a body door having a hinge axis substantially parallel with the line of movement of said hinge post, a closure panel hinged to said hinge post and swingable about said post when in raised position to lie above said door, means for securing said panel to said door to cause same to swing together, said panel having a hinge therein falling substantially in aligment with the door hinge axis.

5. In a vehicle body having a seat back transverse the central portion thereof and having a body top spaced from the upper edges of the body sides leaving side openings both forward and rearward of said seat back, in combination, transformable closure means for closing said openings, comprising: a transverse well located adjacent said seat back, and having a vertical guide post rigidly fixed therein, a hinge post vertically reciprocable within said guide post, two closure panels hinged to said hinge post about a common axis and swingable thereabout forwardly and rearwardly respectively when in raised position to form closures for said side openings, and swingable to closely adjacent parallel transverse position directly above said transverse well to permit their lowering into said well in a compact unit.

6. In a vehicle body having a seat back transverse the central portion thereof and having a body top spaced from the upper edges of the body sides leaving side openings both forward and rearward of said seat back, in combination, transformable closure means for closing said openings, comprising: a transverse well located adjacent said seat back, and having two opposed vertical guide posts fixed therein, a rigid frame vertically reciprocable between and guided by said guide posts, two closure panels hinged to each vertical edge of said frame about a common hinge axis and swingable forwardly and rearwardly respectively when frame is in raised position to lie substantially directly above the body sides and thereby form a closure for said side openings, said closure panels being also swingable into a compact parallel position within said frame to permit said frame and panels to be lowered within said well as a unit.

7. In combination with the body of an automobile, a transverse well in the central part of said body, two opposed vertical guide posts fixed within said well, said guide posts each having an open sided cylindrical guiding surface, two vertically reciprocable hinge posts each having a closure panel hinged thereto by hinges surrounding said hinge posts and coaxial therewith and guided in their vertical movement by said cylindrical guiding surfaces, said closure panels being swingable about said posts when in raised position to lie directly above the body sides and thereby form additional body enclosure means, and also swingable to lie directly above said well to permit said guide posts and panels to be lowered thereinto.

8. In combination with the body of an automobile, a transverse well in the central part of said body, two opposed vertical guide posts fixed within said well, said guide posts each having an open sided cylindrical guiding surface, two vertically reciprocable hinge posts each having a closure panel hinged thereto by a hinge of substantially cylindrical outline surrounding the hinge post and coaxial therewith and guided in vertical movement by said cylindrical guiding surfaces, said closure panels being swingable when in raised position to lie directly above the body sides and thereby form additional body enclosure means, and also swingable into transverse position above the open side of said cylindrical guiding surfaces whereby to permit their lowering into said well.

9. In a vehicle body having a door hinged at one edge to the side of the vehicle body, in combination, removable closure means for effectively increasing the height of the door, including: a vertically reciprocable hinge post having a path of movement closely adjacent to the door hinge and substantially parallel with the axis thereof, a closure panel hinged to said hinge post and swingable about said post when in raised position to lie above said door, means for securing said panel to said door to cause said panel and door to swing together, said panel being also swingable about said post to a position transverse said body, and means to vertically translate said hinge post and panel as a unit to a lowered position within the body when said panel lies in transverse position.

10. In a vehicle body having a seat back extending transversely across said body and having a body top spaced from the top edge of the body sides leaving side openings, in combination, closure means for closing said openings including: a transverse well located relatively close behind said seat back, vertically reciprocable hinge posts at each side of said well, a pair of closure panels hinged to each of said posts by hinges surrounding said hinge posts and coaxial therewith and adapted to lie in said well when said posts are in lowered position and when said posts are in raised position swingable forwardly and rearwardly respectively about said posts as axes to lie substantially immediately above the body sides and thereby form a closure for said side openings on both the forward and rear sides of said hinge posts.

In testimony whereof I hereto affix my signature.

HARVEY D. GEYER.